United States Patent
Yokoi et al.

(10) Patent No.: US 11,531,643 B2
(45) Date of Patent: Dec. 20, 2022

(54) COMPUTER SYSTEM AND METHOD OF EVALUATING CHANGES TO DATA IN A PREDICTION MODEL

(71) Applicant: Hitachi, Ltd., Tokyo (JP)

(72) Inventors: Naoaki Yokoi, Tokyo (JP); Masashi Egi, Tokyo (JP); Daisuke Tashiro, Tokyo (JP); Yuxin Liang, Tokyo (JP)

(73) Assignee: HITACHI, LTD., Tokyo (JP)

( * ) Notice: Subject to any disclaimer, the term of this patent is extended or adjusted under 35 U.S.C. 154(b) by 135 days.

(21) Appl. No.: 16/739,198

(22) Filed: Jan. 10, 2020

(65) Prior Publication Data
US 2020/0233836 A1 Jul. 23, 2020

(30) Foreign Application Priority Data

Jan. 21, 2019 (JP) .............................. JP2019-007836

(51) Int. Cl.
*G06F 16/00* (2019.01)
*G06F 16/11* (2019.01)
(Continued)

(52) U.S. Cl.
CPC .......... *G06F 16/122* (2019.01); *G06F 16/168* (2019.01); *G06F 16/1734* (2019.01); *G06F 16/1824* (2019.01)

(58) Field of Classification Search
CPC .. G06Q 10/06393; G06Q 10/04; G06N 20/00; G06N 5/02; G06N 7/00; G06N 7/005; G06N 5/022; G06N 5/025; G06N 5/04; G06F 11/079; G06F 11/0727; G06F 11/0751
See application file for complete search history.

(56) References Cited

U.S. PATENT DOCUMENTS 8,140,454 B2 * 3/2012 Bullen ................... G06Q 10/04
706/14
8,364,519 B1 * 1/2013 Basu .................. G06Q 10/0637
705/7.38
(Continued)

FOREIGN PATENT DOCUMENTS

JP 2016-118975 A 6/2016

OTHER PUBLICATIONS

Extended European Search Report received in corresponding European Application No. 20152360.2 dated Apr. 2, 2020.
(Continued)

*Primary Examiner* — Polina G Peach
(74) *Attorney, Agent, or Firm* — Mattingly & Malur, PC

(57) ABSTRACT

Provided is a computer system to present information useful for achieving purposes related to an object by utilizing AI prediction. The computer system manages a prediction model for predicting an object event based on evaluation data and feature profiling database that defines a change rule of each of the plurality of feature values included in the evaluation data, generates change policy data by changing the plurality of feature values included in the evaluation data based on the feature profiling database, calculates an evaluation value indicating effectiveness of the change policy data, and generates display data for presenting the change policy data and the evaluation value as information useful for achieving purposes related to the object.

8 Claims, 14 Drawing Sheets

(51) Int. Cl.
    *G06F 16/182* (2019.01)
    *G06F 16/16* (2019.01)
    *G06F 16/17* (2019.01)
    *G06F 16/30* (2019.01)

(56) References Cited

U.S. PATENT DOCUMENTS

| | | | | |
|---|---|---|---|---|
| 9,230,211 | B1* | 1/2016 | Basu | G06Q 10/063 |
| 10,102,240 | B2* | 10/2018 | Balasubramanyan | G06F 16/27 |
| 10,364,662 | B1* | 7/2019 | Basu | G06N 20/00 |
| 10,467,550 | B1* | 11/2019 | Gupta | G06N 20/00 |
| 10,594,710 | B2* | 3/2020 | Wright | H04L 63/1425 |
| 10,628,771 | B1* | 4/2020 | Sicilia | G06Q 10/06393 |
| 10,859,986 | B2* | 12/2020 | Wolkoff | G05B 13/042 |
| 11,087,261 | B1* | 8/2021 | Basu | G06Q 10/0639 |
| 11,243,969 | B1* | 2/2022 | Sayre | G06F 16/25 |
| 2004/0267395 | A1* | 12/2004 | Discenzo | G05B 13/024 |
| | | | | 700/99 |
| 2009/0171879 | A1* | 7/2009 | Bullen | G06Q 10/06 |
| | | | | 706/47 |
| 2011/0055809 | A1* | 3/2011 | Woods | G06F 9/44505 |
| | | | | 717/120 |
| 2015/0244599 | A1* | 8/2015 | Nagai | G06F 11/079 |
| | | | | 709/223 |
| 2016/0103559 | A1* | 4/2016 | Maheshwari | G06F 16/2474 |
| | | | | 715/738 |
| 2016/0104071 | A1* | 4/2016 | Brueckner | G06N 7/005 |
| | | | | 706/52 |
| 2016/0180245 | A1* | 6/2016 | Tereshkov | G06N 20/00 |
| | | | | 706/12 |
| 2016/0203036 | A1* | 7/2016 | Mezic | G06N 7/005 |
| | | | | 714/819 |
| 2017/0019487 | A1* | 1/2017 | Maheshwari | H04L 41/22 |
| 2017/0323403 | A1* | 11/2017 | Johnson | G06Q 10/06314 |
| 2018/0046496 | A1* | 2/2018 | Suzuki | G06F 9/4843 |
| 2018/0123909 | A1* | 5/2018 | Venkitapathi | H04L 67/306 |
| 2018/0247248 | A1 | 8/2018 | Wei et al. | |
| 2018/0288161 | A1* | 10/2018 | Saxena | H04W 4/33 |
| 2019/0122144 | A1* | 4/2019 | Kabeya | G06N 20/00 |
| 2019/0236497 | A1* | 8/2019 | Santos | G16H 10/60 |
| 2020/0134394 | A1* | 4/2020 | Teshome | G06N 7/005 |
| 2020/0227178 | A1* | 7/2020 | Lombardi | G16Y 40/35 |
| 2021/0076966 | A1* | 3/2021 | Grantcharov | G06N 20/00 |
| 2021/0200197 | A1* | 7/2021 | Breyfogle, III | G05B 23/0232 |

OTHER PUBLICATIONS

Ribeiro, et al., "Why Should I Trust You?" Explaining the Predictions of Any Classifier, KDD 2016 San Francisco, CA, USA, ACM.
Lundberg et al.,"A Unified Approach to Interpreting Model Predictions", 31st Conference on Neural Information Processing Systems (NIPS 2017), Long Beach, CA, USA.

* cited by examiner

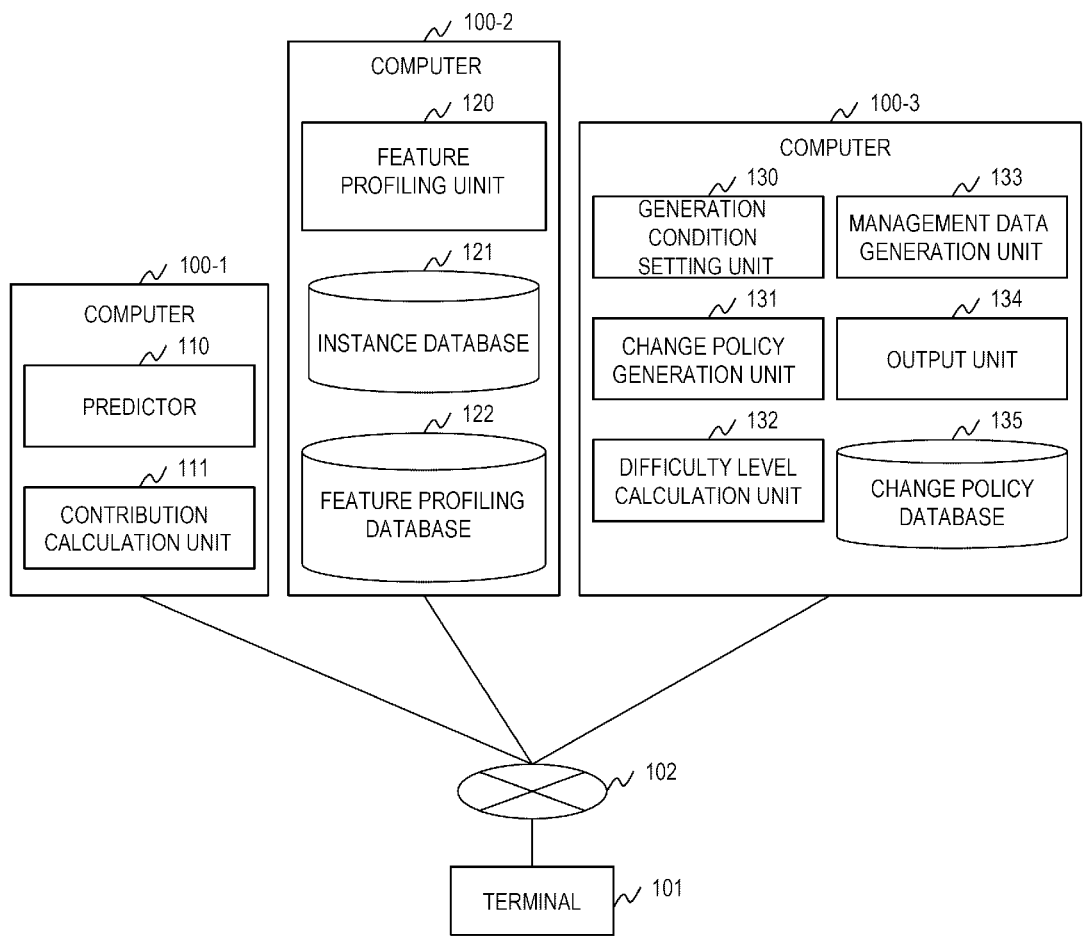
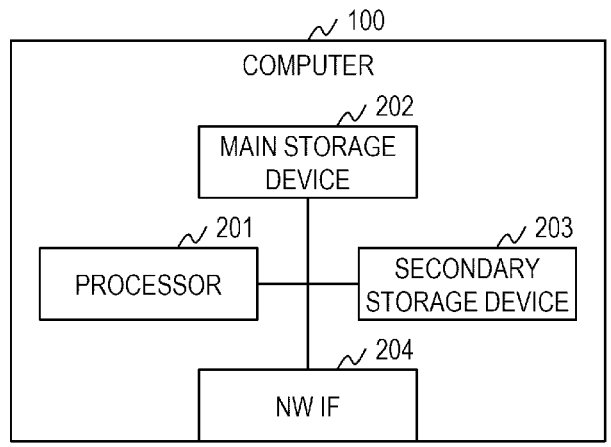

FIG. 3

| ID | FEATURE AMOUNT | | | |
|---|---|---|---|---|
| | NIGHT TRAFFIC | NIGHT NOISE | NIGHT ILLUMINANCE | WEATHER |
| 1 | 3.2 | 32.4 | 0.1 | RAINY |
| ⋮ | ⋮ | ⋮ | ⋮ | ⋮ |

FIG. 4

| FEATURE | VALUE RANGE | INFLUENCE VALUE RANGE | VARIATION UNIT | CONTROL POSSIBILITY |
|---|---|---|---|---|
| NIGHT TRAFFIC | [0] - [981] | [0] - [321] | 0.1 | YES |
| NIGHT NOISE | [0.01] - [642] | [0.01] - [245] | 0.01 | YES |
| NIGHT ILLUMINANCE | [0.1] - [32.5] | [0.1] - [25.0] | 0.1 | YES |
| WEATHER | [SUNNY], [CLOUDY], [RAINY] | - | SUNNY, CLOUDY, RAINY | NO |

FIG. 5

| ID 501 | FEATURE (BEFORE CHANGE) 502 | FEATURE (AFTER CHANGE) 503 | EFFECT 504 | DIFFICULTY LEVEL 505 |
|---|---|---|---|---|
| 1 | {"NIGHT NOISE": 3.2} | {"NIGHT NOISE": 0} | -6 | 2129 |
| 2 | {"NIGHT TRAFFIC": 3.2, "NIGHT NOISE": 24.4} | {"NIGHT TRAFFIC": 321, "NIGHT NOISE": 0.5} | -58 | 211 |
| 3 | {"NIGHT TRAFFIC": 3.2, "NIGHT NOISE": 24.4} | {"NIGHT TRAFFIC": 321, "NIGHT NOISE": 25.0} | -66 | 12 |
| ... | ... | ... | ... | ... |

| ID | CONTRIBUTION | | | | 600 |
|---|---|---|---|---|---|
| | NIGHT TRAFFIC (901) | NIGHT NOISE | NIGHT ILLUMINANCE | WEATHER (902) | |
| 1 | +12.5 | +10.7 | -0.21 | -1.1 | |

FIG. 10

| NIGHT TRAFFIC (1001) | NIGHT NOISE (1002) | NIGHT ILLUMINANCE (1003) | WEATHER (1004) |
|---|---|---|---|
| 2.1 | 32.1 | 45.2 | RAINY |

| ID (1101) | NIGHT TRAFFIC (1102) | NIGHT NOISE (1103) | NIGHT ILLUMINANCE (1104) | WEATHER (1105) |
|---|---|---|---|---|
| 1 | 0 | 32.1 | 45.2 | RAINY |

| ID (1201) | PREDICTION RESULT (1202) |
|---|---|
| 1 | 0.78 |

| ID (1301) | DIFFICULTY LEVEL (1302) |
|---|---|
| 1 | 0 |
| 2 | 2.2 |
| ⋮ | ⋮ |

RESULT WINDOW (2300)

(2301)

| FEATURE | VALUE | CONTRIBUTION |
|---|---|---|
| NIGHT TRAFFIC | 2.1 | +3.2 |
| NIGHT NOISE | 32.1 | +2.7 |
| WEATHER | RAINY | -1.1 |
| NIGHT ILLUMINANCE | 45.2 | -0.21 |

(2310) (2311) (2312) (2313)

(2302)

| ID | FEATURE (BEFORE POLICY EXECUTION) | FEATURE (AFTER POLICY EXECUTION) | EFFECT | DIFFICULTY LEVEL |
|---|---|---|---|---|
| 3 | {"NIGHT TRAFFIC": 3.2, "NIGHT NOISE": 24.4} | {"NIGHT TRAFFIC": 321, "NIGHT NOISE": 25.0} | -66 | 12 |
| 2 | {"NIGHT TRAFFIC": 3.2, "NIGHT NOISE": 24.4} | {"NIGHT TRAFFIC": 321, "NIGHT NOISE": 0.5} | -58 | 211 |
| 1 | {"NIGHT NOISE": 3.2} | {"NIGHT NOISE": 0} | -6 | 2129 |
| ... | ... | ... | ... | ... |

(2320) (2321) (2322) (2323) (2324) (2325)

COMPUTER SYSTEM AND METHOD OF EVALUATING CHANGES TO DATA IN A PREDICTION MODEL

CLAIM OF PRIORITY

The present application claims priority from Japanese patent application JP 2019-007836 filed on Jan. 21, 2019, the content of which is hereby incorporated by reference into this application.

BACKGROUND OF THE INVENTION

1. Field of the Invention

The present invention relates to a system and a method of presenting information useful for achieving purposes related to an object using AI object event prediction.

2. Description of the Related Art

In recent years, systems using AI for predicting object events have been provided in various fields such as city planning, medical care, and finance. For example, in city planning, an occurrence risk (event) of a crime of a town (object) is predicted by utilizing AI. In the medical field, AI is utilized to predict an incidence rate (event) of a disease of a patient (object) and specify a symptom (event). In the financial field, an occurrence rate (event) of loan loss of an applicant (object) is predicted by utilizing AI.

There is a need for a technique for presenting information useful for achieving purposes related to an object such as improvement of KPIs by utilizing AI prediction. For example, as a result of predicting the occurrence risk (event) of a crime in the town (object) utilizing AI, there is a need for a technique that shows what measures should be taken to reduce the risk of a town that is predicted to be of high risk. Correspondingly, a technique described in JP-A-2016-118975 (Patent Literature 1) is known.

Patent Literature 1 discloses a marketing policy optimization device "including a KPI selection unit that selects a KPI which is a quantitative evaluation index of a marketing policy, a target value setting unit that sets a KPI target value, a policy response rate calculation unit that uses a coefficient related to basic attributes of a customer included in a customer profile database and calculates a KPI prediction value which is a policy response rate of marketing by referring to a marketing policy case executed in the past, and an optimization policy recommendation unit that recommends implementation of a marketing policy when the KPI prediction value exceeds the KPI target value".

In the technique described in Patent Literature 1, the marketing policy is proposed based on the marketing policy implemented in the past. Therefore, only a marketing policy that coincides with or is similar to the marketing policy implemented in the past can be proposed. In addition, the technique in Patent Literature 1 does not utilize the AI prediction.

SUMMARY OF THE INVENTION

The invention provides a system and a method of presenting information useful for achieving purposes related to an object by utilizing AI prediction.

A representative example of the invention disclosed in the present application is as follows. That is, a computer system includes at least one computer having a processor and a memory connected to the processor. The computer system manages a prediction model (an algorithm) for predicting an object event based on evaluation data including a plurality of feature values indicating an object state, and feature profiling database that defines a change rule of each of the plurality of feature values included in the evaluation data, which is generated based on a result of the object event prediction. The processor generates a plurality of pieces of change policy data by changing the plurality of feature values included in the evaluation data based on the feature profiling database, calculates an evaluation value indicating effectiveness of each of the plurality of pieces of change policy data using the prediction model, the evaluation data, and the plurality of pieces of change policy data, generates display data for presenting the plurality of pieces of change policy data and the evaluation value of each of the plurality of pieces of change policy data as information useful for achieving purposes related to an object, and outputs the display data.

According to an aspect of the invention, the change policy data can be presented as information useful for achieving the purposes related to the object by utilizing a result of AI prediction implemented by a prediction model. Problems, configurations and effects other than those described above will be clarified by the description of the following embodiment.

BRIEF DESCRIPTION OF THE DRAWINGS

FIG. 1 is a diagram showing an example of a configuration of a computer system according to a first embodiment;

FIG. 2 is a diagram showing an example of a hardware configuration of a computer according to the first embodiment;

FIG. 3 is a diagram showing an example of a data structure of instance database according to the first embodiment;

FIG. 4 is a diagram showing an example of a data structure of feature profiling database according to the first embodiment;

FIG. 5 is a diagram showing an example of a data structure of change policy database according to the first embodiment;

FIG. 9 is a diagram showing an example of a data structure of a contribution vector according to the first embodiment;

FIG. 10 is a diagram showing an example of a data structure of evaluation data according to the first embodiment;

FIG. 11 is a diagram showing an example of a data structure of change policy data according to the first embodiment;

FIG. 12 is a diagram showing an example of a data structure of prediction result data according to the first embodiment;

FIG. 13 is a diagram showing an example of a data structure of difficulty level data according to the first embodiment;

FIG. 23 is a diagram showing an example of a result display screen displayed on a terminal according to the first embodiment.

DESCRIPTION OF THE PREFERRED EMBODIMENTS

Figure 6:
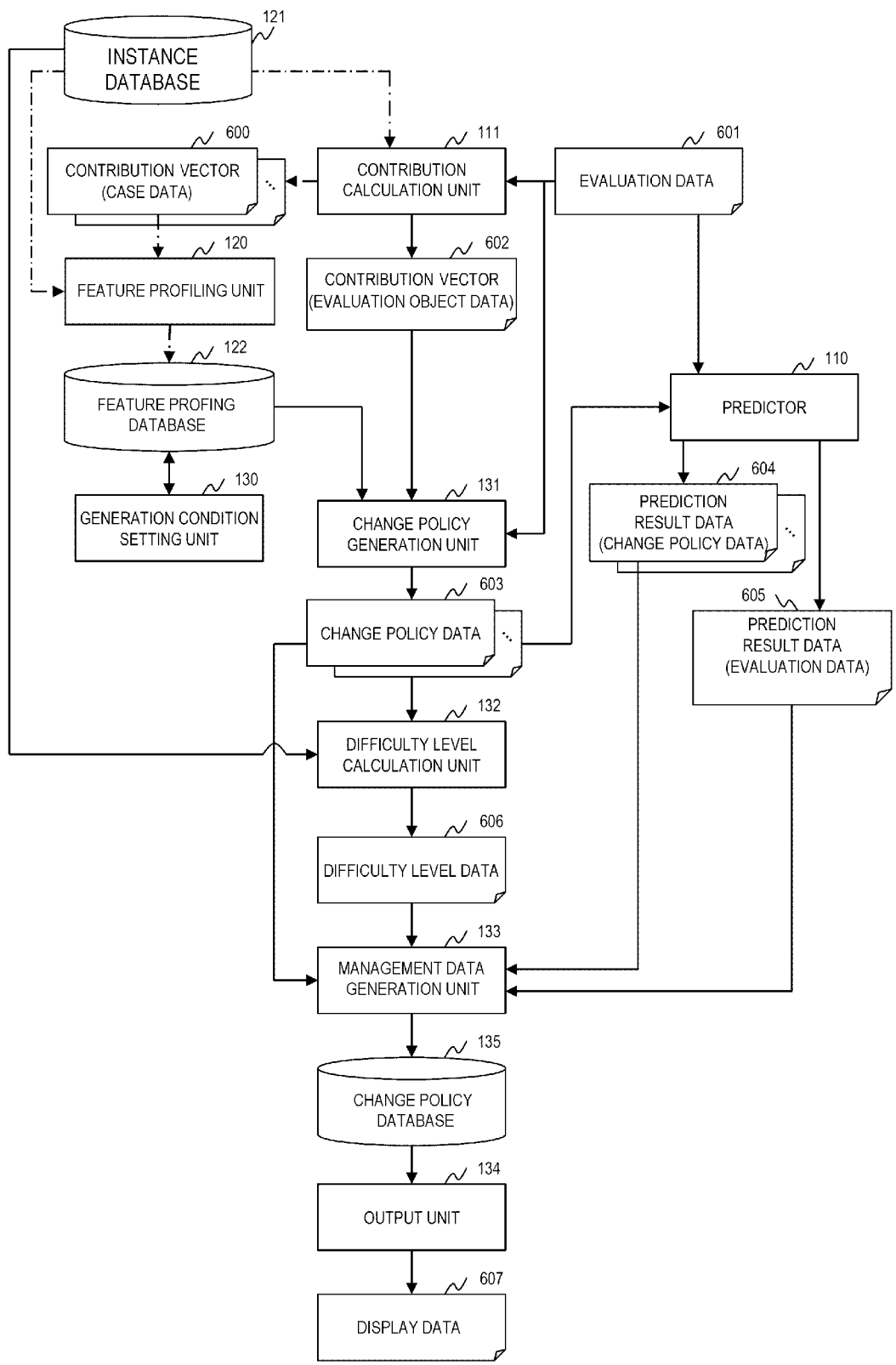
FIG. 6 is a diagram showing an outline of processing executed in the computer system according to the first embodiment.

An embodiment of the invention will be described below with reference to the drawings. However, the invention should not be construed as being limited to the description of the embodiment described below. It will be easily understood by those skilled in the art that the specific configuration may be modified without departing from a spirit or a scope of the invention.

In the configuration of the invention described below, the same or similar components or functions are denoted by the same reference numerals, and repetitive descriptions thereof will be omitted.

Terms such as "first", "second", "third" in the present specification are used to identify constituent elements and do not necessarily limit the number or order.

Positions, sizes, shapes, ranges, and the like of respective components in the drawings are illustrated in order to facilitate understanding of the invention and may not represent actual positions, sizes, shapes, ranges, and the like. Therefore, the invention is not limited to the positions, sizes, shapes, and ranges disclosed in the drawings.

First Embodiment

FIG. 1 is a diagram showing an example of a configuration of a computer system according to a first embodiment.

The computer system includes computers 100-1, 100-2, and 100-3, and a terminal 101. The computers 100-1, 100-2, and 100-3 and the terminal 101 are connected to each other via a network 102 such as a Wide Area Network (WAN) and a Local Area Network (LAN). A connection method of the network 102 may be either wired or wireless.

In the following description, the computers 100-1, 100-2, and 100-3 will be referred to as a computer 100.

The terminal 101 is a computer operated by a user and includes a processor, a main storage device, a secondary storage device, a network interface, an input device, and an output device (which are not shown). The input device is a keyboard, a mouse, a touch panel, or the like. The output device is a display, a printer, or the like.

The computer 100-1 is a computer that predicts an object event. For example, the computer 100-1 predicts an occurrence risk (event) of a crime of a town (object) and an incidence rate (event) of a disease of a patient (object). The computer 100-1 includes a predictor 110 and a contribution calculation unit 111.

The predictor 110 predicts an object event by processing input data indicating an object state based on a prediction model (not shown) generated by machine learning or the like. The prediction model includes information related to a neural network, a decision tree, and the like. The input data includes a plurality of feature values indicating an object state. Instance data and evaluation data 601 (see FIG. 6) to be described below are examples of the input data.

The contribution calculation unit 111 calculates a contribution (an influence degree) indicating the strength of the influence of the feature values on a prediction result for the feature values included in the input data. The contribution calculation unit 111 generates a contribution vector having a contribution of each feature as an element. The contribution can be calculated using, for example, a calculation method described in Marco Tulio Ribeiro, et al. "Why Should I Trust You?": Explaining the Predictions of Any Classifier, KDD'16 Proceedings of the 22nd ACM SIGKDD International Conference on Knowledge Discovery and Data Mining, pages 1135 to 1144 (Non-Patent Literature 1) or Scott M Lundberg et al. "A Unified Approach to Interpreting Model Predictions", Advances in Neural Information Processing Systems 30, December 2017, pages 4765 to 4774 (Non-Patent Literature 2). The invention is not limited to the calculation method of the contribution.

The computer 100-2 analyzes characteristics of features included in the input data. The computer 100-2 includes a feature profiling unit 120 and manages instance database 121 and feature profiling database 122.

The instance database 121 is information for managing instance data. Here, the instance data is input data used to analyze characteristics of the features. The instance data may be data previously input to the predictor 110 or may be learning data for generating the prediction model. The data structure of the instance database 121 will be described in detail with reference to FIG. 3.

The feature profiling database 122 is information for managing a feature profile indicating characteristics of the features included in the input data. The data structure of the feature profiling database 122 will be described in detail with reference to FIG. 4.

The feature profiling unit 120 analyzes the instance data stored in the instance database 121, and generates the feature profiling database 122.

The computer 100-3 generates change policy data 603 (see FIG. 6) indicating a change policy of the object state for achieving purposes related to an object such as improvement of KPI. The computer 100-3 also calculates an evaluation value indicating validity of the change policy data 603. As will be described below, the change policy data 603 is generated by changing a value of an arbitrary feature of the evaluation data 601 based on a change rule. The computer 100-3 includes a generation condition setting unit 130, a change policy generation unit 131, a difficulty level calculation unit 132, a management data generation unit 133, and an output unit 134 and manages change policy database 135.

The change policy database 135 is information for managing the change policy data 603. Details of a data structure of the change policy database 135 will be described with reference to FIG. 5.

The generation condition setting unit 130 sets a generation condition for specifying a feature that changes a value at the time of generation of the change policy data 603. The generation condition is reflected in the feature profiling database 122.

The change policy generation unit 131 generates the change policy data 603 from the evaluation data 601 based on the feature profiling database 122. When narrowing down the feature to be changed, a contribution vector 602 of the evaluation data 601 may be used.

The difficulty level calculation unit 132 calculates a difficulty level indicating a degree of difficulty of changing from an object state indicated by the evaluation target data 601 to an object state indicated by the change policy data 603. The difficulty level is an evaluation value.

The management data generation unit 133 generates the change policy database 135 based on the generated change policy data 603.

The output unit 134 generates display data 607 (see FIG. 6) for presenting the change policy data 603 and an evaluation value to the user based on the change policy database 135, and transmits the generated display data 607 to the terminal 101.

Any of the computers 100-1, 100-2, and 100-3 may include an operation receiving unit that provides an Application Programming Interface (API) for receiving a request from the terminal 101.

Here, hardware configurations of the computer 100 will be described. FIG. 2 is a diagram showing an example of the hardware configurations of the computer 100 according to the first embodiment.

The computer 100 includes a processor 201, a main storage device 202, a secondary storage device 203, and a network interface 204. The hardware configurations are connected to each other via an internal bus. The computer 100 may not include the secondary storage device 203. The computer 100 may include an input device and an output device.

The processor 201 executes a program stored in the main storage device 202. The processor 201 executes processing in accordance with the program, thereby operating as a functional unit (module) that implements a specific function such as the predictor 110. In the following description, when processing is described with a functional unit as a subject, it is indicated that the processor 201 executes a program that implements the functional unit.

The main storage device 202 stores the program executed by the processor 201 and information used by the program. The main storage device 202 includes a work area temporarily used by the program.

The main storage device 202 of the computer 100-1 stores a program for implementing the predictor 110 and the contribution calculation unit 111, and a prediction model. The program that implements the predictor 110 processes input data based on the prediction model. The main storage device 202 of the computer 100-2 stores a program for implementing the feature profiling unit 120. The main storage device 202 of the computer 100-3 stores a program for implementing the generation condition setting unit 130, the change policy generation unit 131, the difficulty level calculation unit 132, the management data generation unit 133, and the output unit 134.

The secondary storage device 203 such as a Hard Disk Drive (HDD) and a Solid State Drive (SSD) permanently stores data.

The secondary storage device 203 of the computer 100-2 stores the instance database 121 and the feature profiling database 122. The instance database 121 may be stored in a storage system accessible by the computer 100-2. The secondary storage device 203 of the computer 100-3 stores the change policy database 135.

For each functional unit included in each computer 100, a plurality of functional units may be combined into one functional unit, or a single functional unit may be divided into a plurality of functional units for each function. The functional units of the computers 100 may be combined into a single computer 100.

FIG. 3 is a diagram showing an example of a data structure of the instance database 121 according to the first embodiment.

The instance database 121 stores an entry including an ID 301 and a feature 302. One entry exists for one piece of instance data.

The ID 301 is a field that stores identification information of the instance data. In the ID 301, for example, a number is stored. The feature 302 is a field group that stores a value of the feature included in the instance data.

The predictor 110 according to the first embodiment processes input data including night traffic, night noise, night illuminance, and weather as features. The invention is not limited to the number and types of features included in the input data.

FIG. 4 is a diagram showing an example of a data structure of the feature profiling database 122 according to the first embodiment.

The feature profiling database 122 stores an entry including a feature 401, a value range 402, an influence value range 403, a variation unit 404, and a control possibility 405. One entry exists for profile data of one feature. In the feature profiling database 122 according to the first embodiment, four entries of night traffic, night noise, night illuminance, and weather are stored.

The feature 401 is a field that stores identification information of the feature included in the input data. The feature 401 stores, for example, a name of the feature.

The value range 402 is a field that stores a range of values that may be taken by the feature. When the feature is a numerical value, a maximum value and a minimum value are stored in the value range 402, and when the feature is a character string, all character strings set as the feature are stored in the value range 402.

The influence value range 403 is a field that stores a range of feature values that affect the contribution. That is, when the feature value is changed within the range indicated by the influence value range 403, the contribution of the feature also changes.

The variation unit 404 is a field that stores a variation unit of the feature value. When the feature is a numerical value, a minimum value of the variation amount of the value is stored in the variation unit 404; when the feature is a character string, all the character strings set as the feature are stored in the variation unit 404.

The control possibility 405 is a field that stores information indicating whether or not a value is a changeable feature. In the control possibility 405, one of "YES" and "NO" is stored. "YES" indicates that the feature value can be changed, and "NO" indicates that the feature value cannot be changed.

FIG. 5 is a diagram showing an example of a data structure of the change policy database 135 according to the first embodiment.

The change policy database 135 includes an entry including an ID 501, a feature 502, a feature 503, an effect 504, and a difficulty level 505. One entry exists for one piece of the change policy data 603.

The ID 501 is a field that stores identification information of an entry stored in the change policy database 135.

The feature 502 is a field that stores a value before change of a feature that is changed when the change policy data 603 is generated from the evaluation data 601. The feature 502 stores a value of a feature included in the evaluation data 601.

The computer 100-3 may not hold the change policy data 603 itself, which can reproduce the change policy data 603 based on the evaluation data 601 and the feature 503.

The feature 503 is a field that stores a value after change of a feature that is changed when the change policy data 603 is generated from the evaluation data 601. The feature 503 stores the feature value included in the change policy data 603.

The effect 504 is a field that stores an index indicating validity in a case of the object state indicated by the change policy data 603. For example, the effect 504 stores a value indicating an improvement effect of the KPI. The effect is an evaluation value. The difficulty level 505 is a field that stores a difficulty level.

Figure 7:
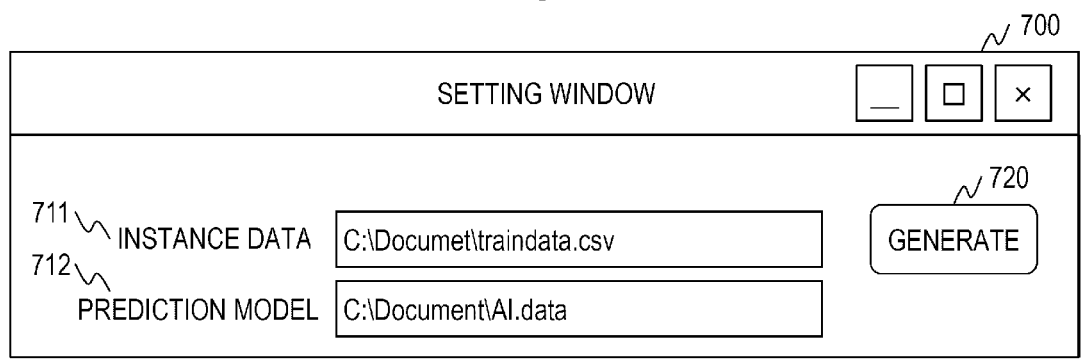
FIG. 7 is a diagram showing an example of a screen displayed on a terminal according to the first embodiment.
Figure 8:
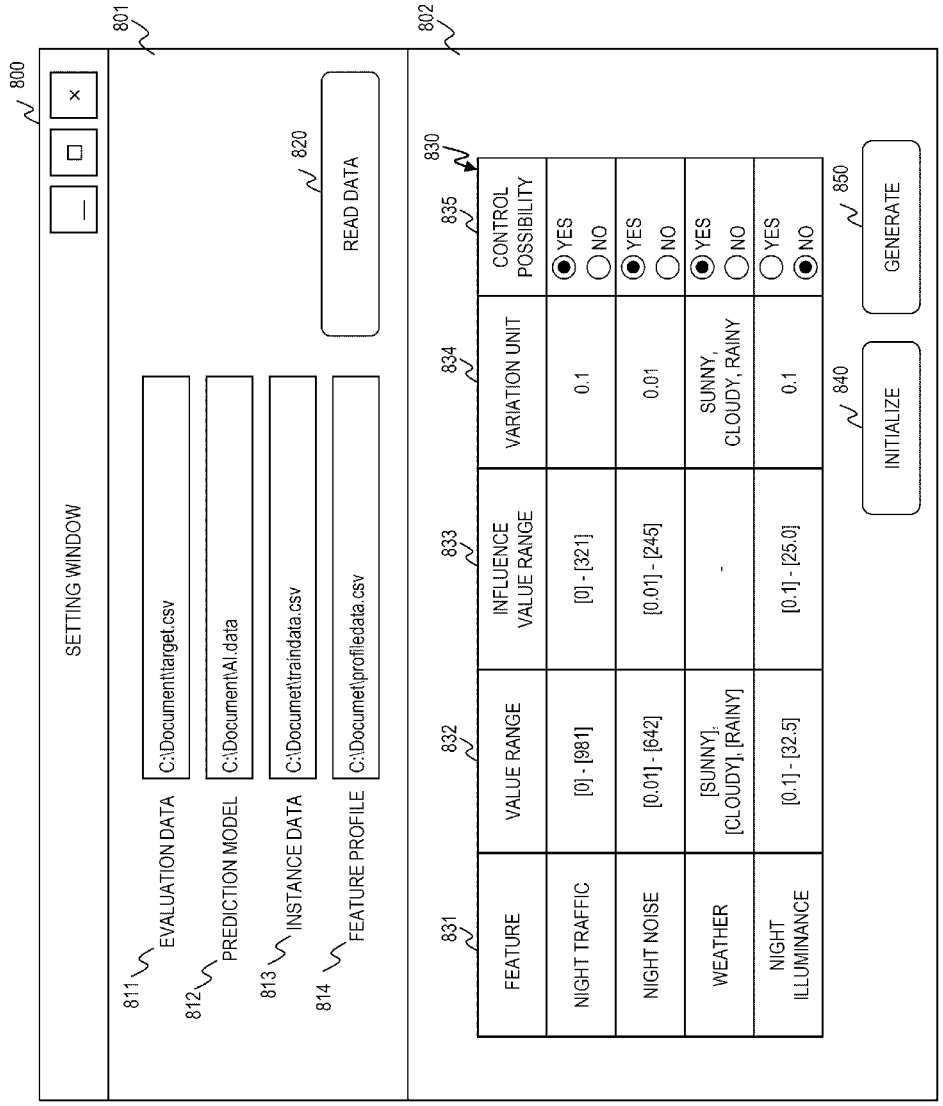
FIG. 8 is a diagram showing an example of a screen displayed on the terminal according to the first embodiment.

FIG. 6 is a diagram showing an outline of processing executed in the computer system according to the first embodiment. FIGS. 7 and 8 are diagrams showing an example of a screen displayed on the terminal 101 according to the first embodiment.

Dashed-dotted lines indicate a flow of processing of generating the feature profiling database 122. Solid lines indicate a flow of processing of generating the change policy data 603.

First, processing of generating the feature profiling database 122 will be described. The feature profiling unit 120 presents a setting window 700 to the terminal 101. Here, the setting window 700 will be described.

The setting window 700 includes a instance data input field 711, a prediction model input field 712, and a generate button 720.

The instance data input field 711 is a field for inputting a storage location of the instance database 121. The prediction model input field 712 is a field for inputting a storage location of a prediction model. The generate button 720 is an operation button for outputting a generation request of a feature profile.

When the generate button 720 is operated, the terminal 101 transmits the generation request of the feature profile including data indicating a storage location of the instance database 121 and the prediction model to the feature profiling unit 120. The description will now return to FIG. 6.

When receiving the generation request of the feature profile, the feature profiling unit 120 transmits a generation request of a contribution vector to the contribution calculation unit 111.

The contribution calculation unit 111 calculates a contribution of a feature included in the instance data in cooperation with the predictor 110, and generates a contribution vector 600 having a contribution of each feature as an element. One contribution vector 600 is generated for one piece of instance data. The contribution calculation unit 111 transmits the generated contribution vector 600 to the feature profiling unit 120.

When receiving the contribution vector 600, the feature profiling unit 120 executes analysis processing using the contribution vector 600 of the instance data and the instance data, and generates the feature profiling database 122.

Next, processing of generating the change policy data 603 will be described. The computer 100-3 presents a setting window 800. For example, the generation condition setting unit 130 presents the setting window 800. Here, the setting window 800 will be described.

The setting window 800 includes a data selection field 801 and a generation condition setting field 802.

The data selection field 801 is a field for selecting data to be used for generating the change policy data 603. The data selection field 801 includes an evaluation data input field 811, a prediction model input field 812, a instance data input field 813, a feature profile input field 814, and a read data button 820.

The evaluation data input field 811 is a field for inputting a storage location of the evaluation data 601. The prediction model input field 812 is a field for inputting a storage location of the prediction model. The instance data input field 813 is a field for inputting a storage location of the instance database 121. The feature profile input field 814 is a field for inputting a storage location of the feature profiling database 122. The read data button 820 is an operation button for reading out data specified in the evaluation data input field 811, the prediction model input field 812, and the feature profile input field 814.

When the read data button 820 is operated, the terminal 101 transmits a read out request including data indicating a storage location of each piece of data to the computer 100-3. In this case, the generation condition setting unit 130 presents a generation condition table 830 to the generation condition setting field 802.

The generation condition setting field 802 is a field for setting generation conditions. The generation condition setting field 802 includes the generation condition table 830, an initialize button 840, and a generate button 850.

The generation condition table 830 is a table that displays a change rule of each feature. The generation condition table 830 includes an entry including a feature 831, a value range 832, an influence value range 833, a variation unit 834, and a control possibility 835. One entry corresponds to one feature.

The feature 831 is a field that stores identification information of the feature. The value range 832 is a field that stores a range of values that may be taken by the feature. The value range 832 is a field corresponding to the value range 402. The influence value range 833 is a field that stores a range of feature values affecting the contribution. The influence value range 833 is a field corresponding to the influence value range 403. The variation unit 834 is a field that stores a variation unit of a feature value. The variation unit 834 is a field corresponding to the variation unit 404.

The control possibility 835 is a field for selecting whether or not the feature value can be changed. The control possibility 835 includes radio buttons for selecting "YES" and "NO". An operation result of the control possibility 835 is reflected in the control possibility 405 of the feature profiling database 122.

The initialize button 840 is an operation button for initializing the operation of the control possibility 835. The generate button 850 is an operation button for outputting a generation request of the change policy data 603.

When the generate button 850 is operated, the terminal 101 transmits a generation request of the change policy data 603 including data indicating storage locations of the instance database 121, the feature profiling database 122, the evaluation data 601, and the prediction model, and the operation result of the control possibility 835 to the computer 100-3. The description will now return to FIG. 6.

When the generation condition setting unit 130 receives the generation request of the change policy data 603, the generation condition setting unit 130 updates the feature profiling database 122 based on the operation result of the control possibility 835. Thereafter, the generation condition setting unit 130 transfers the generation request to the change policy generation unit 131.

When the change policy generation unit 131 receives the generation request of the change policy data 603, the change policy generation unit 131 generates the change policy data 603 by changing the feature value included in the evaluation data 601 based on the feature profiling database 122.

The change policy generation unit 131 transmits a difficulty level calculation request to the difficulty level calculation unit 132. After the difficulty level is calculated, the change policy generation unit 131 transmits a generation request of the change policy database 135 to the management data generation unit 133. After the change policy database 135 is generated, the change policy generation unit 131 transmits an output request to the output unit 134. When narrowing down the feature to be changed, the change policy generation unit 131 transmits a generation request of the contribution vector to the contribution calculation unit 111.

The difficulty level calculation unit 132 calculates the difficulty level of the change policy data 603 by using the change policy data 603 and the instance data stored in the instance database 121. The change policy generation unit 131 generates difficulty level data 606 from a calculation result of the difficulty level.

The management data generation unit 133 transmits a prediction request to the predictor 110. The predictor 110 outputs prediction result data 604 and 605 by processing the evaluation data 601 and the change policy data 603 based on the prediction model. The predictor 110 transmits the prediction result data 604 and 605 to the management data generation unit 133. The management data generation unit 133 generates the change policy database 135 based on the change policy data 603, the prediction result data 604 and 605, and the difficulty level data 606.

The output unit 134 generates the display data 607 based on the evaluation data 601, the prediction result data 605, and the change policy database 135, and transmits the display data to the terminal 101.

Here, the structure of data processed or output in the computer system will be described with reference to FIGS. 9 to 13.

FIG. 9 is a diagram showing an example of a data structure of the contribution vector 600 according to the first embodiment.

The contribution vector 600 includes an ID 901 and a contribution 902. The ID 901 is a field that stores identification information of the instance data. The contribution 902 is a field group that stores a contribution of a feature that is an element of the contribution vector.

The contribution vector 602 also has a similar data structure. However, the contribution vector 602 does not include a field corresponding to the ID 901.

FIG. 10 is a diagram showing an example of a data structure of the evaluation data 601 according to the first embodiment. FIG. 11 is a diagram showing an example of a data structure of the change policy data 603 according to the first embodiment.

The evaluation data 601 includes a plurality of features. The evaluation data 601 shown in FIG. 10 includes night traffic 1001, night noise 1002, night illuminance 1003, and weather 1004 as feature values.

Night traffic 1102, night noise 1103, night illuminance 1104, and weather 1105 of the change policy data 603 are the same fields as the night traffic 1001, the night noise 1002, the night illuminance 1003, and the weather 1004. The change policy data 603 includes an ID 1101 which is a field that stores identification information of the change policy data 603.

FIG. 12 is a diagram showing an example of a data structure of the prediction result data 604 according to the first embodiment.

The prediction result data 604 includes an ID 1201 and a prediction result 1202.

The ID 1201 is a field that stores identification information of the change policy data 603. The prediction result 1202 is a field that stores a prediction result of the change policy data 603 output from the predictor 110.

FIG. 13 is a diagram showing an example of a data structure of the difficulty level data 606 according to the first embodiment.

The difficulty level data 606 includes an entry including an ID 1301 and a difficulty level 1302. One entry exists for one piece of the change policy data 603.

The ID 1301 is a field that stores identification information of the change policy data 603. The difficulty level 1302 is a field that stores a difficulty level of the change policy data 603.

Next, the processing executed in the computer system will be described in detail with reference to a flowchart. First, processing of generating the feature profiling database 122 will be described in detail with reference to FIGS. 14 to 16.

Figure 14:
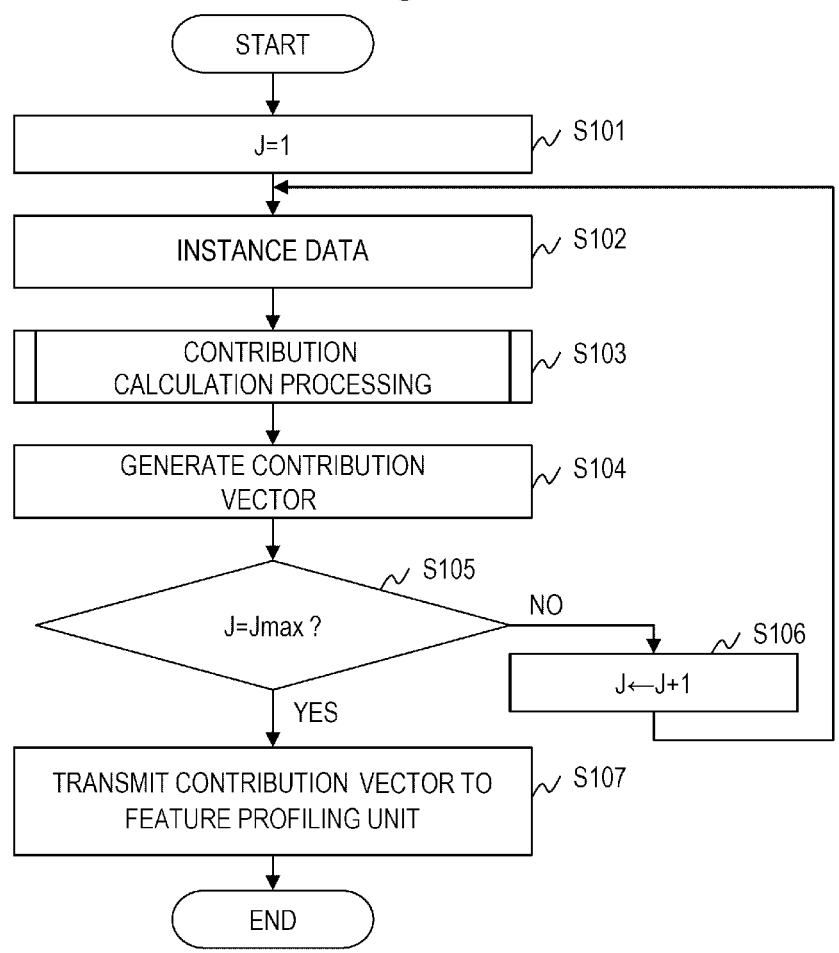
FIG. 14 is a flowchart illustrating an example of contribution vector generation processing of instance data executed by a contribution calculation unit according to the first embodiment.

FIG. 14 is a flowchart illustrating an example of generation processing of the contribution vector 600 of instance data executed by the contribution calculation unit 111 according to the first embodiment.

When the contribution calculation unit 111 receives a generation request of the contribution vector including data indicating the storage locations of the instance database 121 and the prediction model, the contribution calculation unit 111 starts the processing described below.

The contribution calculation unit 111 initializes a variable J (step S101). Here, the variable J is a variable indicating a number for identifying instance data.

Specifically, the contribution calculation unit 111 sets 1 to the variable J. At this time, the contribution calculation unit 111 sets the number of pieces of instance data stored in the instance database 121 to Jmax.

Next, the contribution calculation unit 111 acquires the instance data corresponding to the variable J from the instance database 121 (step S102), and executes contribution calculation processing for calculating the contribution of the feature included in the instance data (step S103). The contribution calculation processing will be described in detail with reference to FIG. 15.

Next, the contribution calculation unit 111 generates the contribution vector 600 having the calculated contribution of each feature as an element (step S104).

Next, the contribution calculation unit 111 determines whether or not the variable J coincides with Jmax (step S105). That is, it is determined whether or not the processing for all the instance data is completed.

When it is determined that the variable J does not coincide with Jmax, the contribution calculation unit 111 sets a value obtained by adding 1 to the variable J to the variable J (step S106), and then returns to step S102.

When it is determined that the variable J coincides with Jmax, the contribution calculation unit 111 transmits all the calculated contribution vectors 600 to the feature profiling unit 120 (step S107). After that, the contribution calculation unit 111 ends the generation processing of the contribution vector 600 of the instance data.

Figure 15:
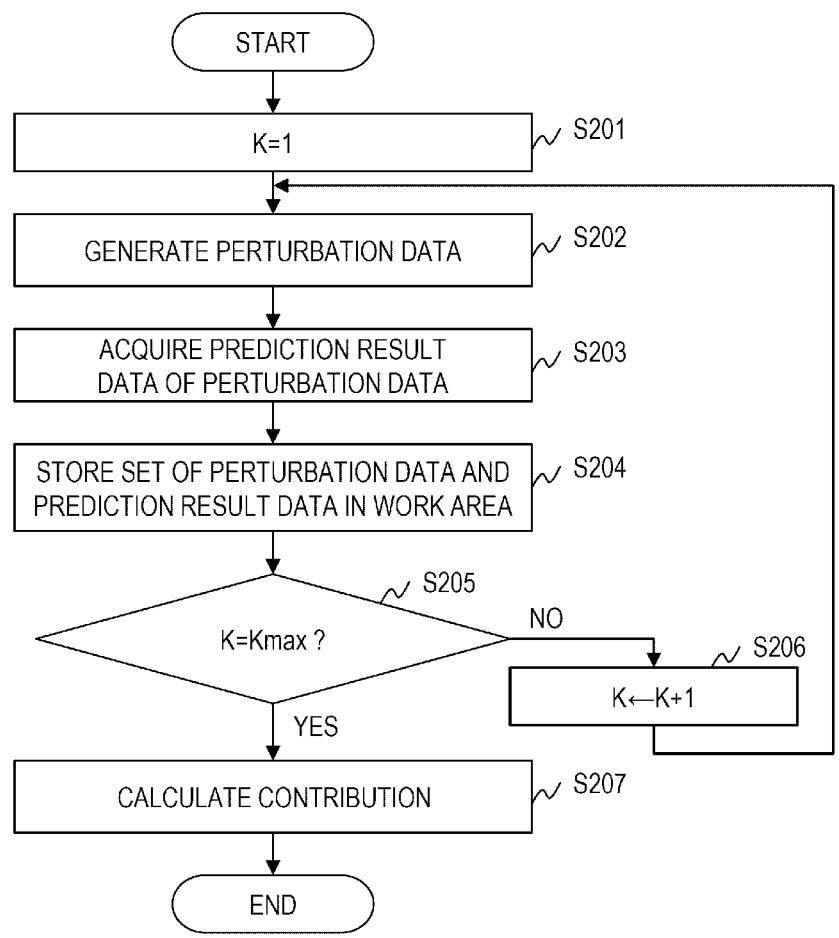
FIG. 15 is a flowchart illustrating an example of contribution calculation processing executed by the contribution calculation unit according to the first embodiment.

FIG. 15 is a flowchart illustrating an example of the contribution calculation processing executed by the contribution calculation unit 111 according to the first embodiment.

The contribution calculation unit 111 initializes a variable K (step S201). Here, the variable K is a variable indicating a number for identifying perturbation data generated from the instance data.

Specifically, the contribution calculation unit 111 sets 1 to the variable K. At this time, the contribution calculation unit 111 sets the number of pieces of generated perturbation data to Kmax. It is assumed that the number of pieces of generated perturbation data is set in advance.

Next, the contribution calculation unit 111 generates perturbation data corresponding to the variable K (step S202). The contribution calculation unit 111 inputs the perturbation data to the predictor 110, and acquires prediction result data of the perturbation data output from the predictor 110 (step S203).

Next, the contribution calculation unit 111 temporarily stores a set of the perturbation data and the prediction result data in a work area (step S204).

Next, the contribution calculation unit 111 determines whether or not the variable K coincides with Kmax (step S205).

When it is determined that the variable K does not coincide with Kmax, the contribution calculation unit 111 sets a value obtained by adding 1 to the variable K to the variable K (step S206), and then returns to step S202.

When it is determined that the variable K coincides with Kmax, the contribution calculation unit 111 calculates the contribution of each feature of the instance data by using a plurality of sets (step S207). After that, the contribution calculation unit 111 ends the contribution calculation processing.

Figure 16:
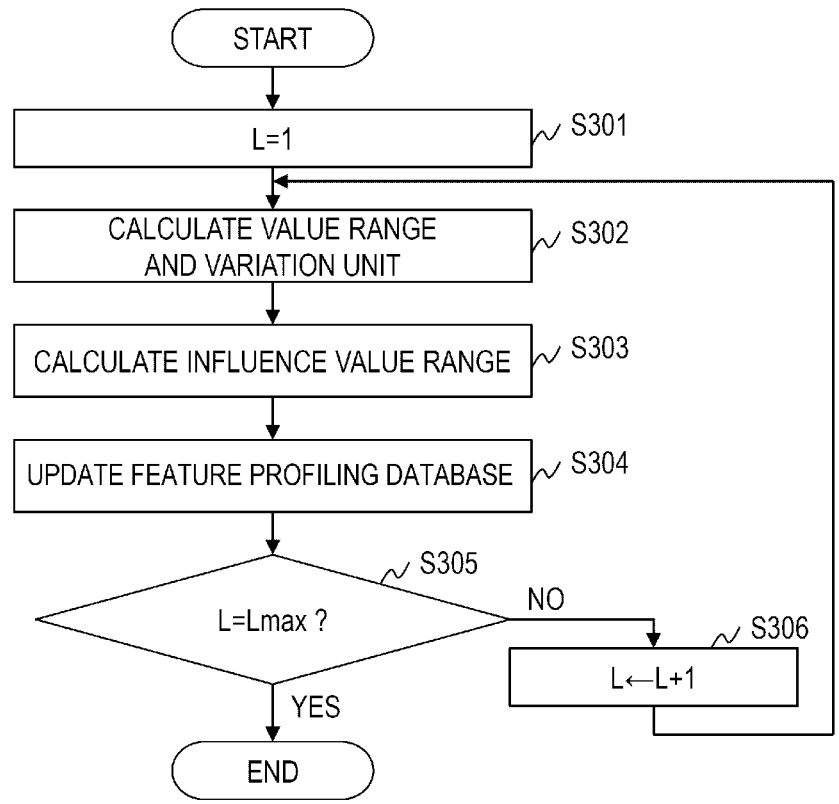
FIG. 16 is a flowchart illustrating an example of generation processing of feature profiling database executed by a feature profiling unit according to the first embodiment.

FIG. 16 is a flowchart illustrating an example of generation processing of the feature profiling database 122 executed by the feature profiling unit 120 according to the first embodiment.

When the feature profiling unit 120 receives the contribution vector 600 from the contribution calculation unit 111, the feature generation unit 120 starts processing described below.

The feature profiling unit 120 initializes a variable L (step S301). Here, the variable L is a variable indicating a number for identifying a feature included in the instance data. In the following description, a feature corresponding to the variable L is also referred to as an object feature.

Specifically, the feature profiling unit 120 sets 1 to the variable L. At this time, the feature profiling unit 120 sets the number of features included in the instance data to Lmax.

Next, the feature profiling unit 120 calculates a value range and a change unit of the target feature by analyzing the target feature value of the instance data stored in the instance database 121 (step S302).

Specifically, the feature profiling unit 120 calculates a range defined by a maximum value and a minimum value of values stored in the target feature as a value range. Further, the feature profiling unit 120 calculates a minimum value of differences between the target feature values as a change unit.

Next, the feature profiling unit 120 calculates an influence value range of the target feature by analyzing a relationship between the instance data stored in the instance database 121 and the contribution vector 600 of the instance data (step S303).

For example, the feature profiling unit 120 calculates a range of values where the contribution is greater than a threshold as the influence value range. Further, the feature profiling unit 120 calculates a range of values where a change rate of the contribution is greater than a threshold as the influence value range.

Next, the feature profiling unit 120 updates the feature profiling database 122 by adding the profile of the target feature (step S304). Specifically, the following processing is executed.

The feature profiling unit 120 adds an entry to the feature profiling database 122, and sets the identification information of the target feature to the feature 401 of the added entry.

The feature profiling unit 120 stores the processing result of step S302 in the value range 402 and the variation unit 404 of the added entry, and stores the processing result of step S303 in the influence value range 403. At this time point, the control possibility 405 of the added entry is blank. The above is the description of the processing in step S304.

Next, the feature profiling unit 120 determines whether or not the variable L coincides with Lmax (step S305). That is, it is determined whether or not the processing of all features is completed.

When it is determined that the variable L does not coincide with Lmax, the feature profiling unit 120 sets a value obtained by adding 1 to the variable L to the variable L (step S306), and then returns to step S302.

When it is determined that the variable L coincides with Lmax, the contribution calculation unit 111 ends the feature profile generation processing.

Next, details of processing of generating and presenting the change policy data 603 will be described with reference to FIGS. 17 to 23.

Figure 17:
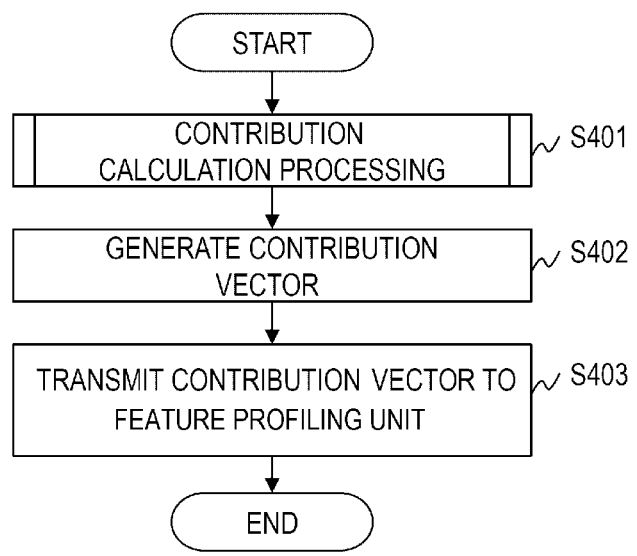
FIG. 17 is a flowchart illustrating an example of generation processing of a contribution vector of evaluation data executed by the contribution calculation unit according to the first embodiment.

FIG. 17 is a flowchart illustrating an example of generation processing of the contribution vector 602 of the evaluation data 601 executed by the contribution calculation unit 111 according to the first embodiment.

When the contribution calculation unit 111 receives a generation request of the contribution vector including data indicating the storage locations of the evaluation data 601 and the prediction model, the contribution calculation unit 111 starts the processing described below.

The contribution calculation unit 111 executes contribution calculation processing for calculating the contribution of the feature included in the evaluation data 601 (step S401). The contribution calculation processing is the same as the processing described in FIG. 15.

The contribution calculation unit 111 generates the contribution vector 602 having the calculated contribution of each feature as an element (step S402). The processing of step S402 is the same as the processing of step S104.

Next, the contribution calculation unit 111 transmits the generated contribution vector 602 to the feature profiling unit 120 (step S403). After that, the contribution calculation unit 111 ends the generation processing of the contribution vector 602 of the evaluation data 601.

Figure 18:
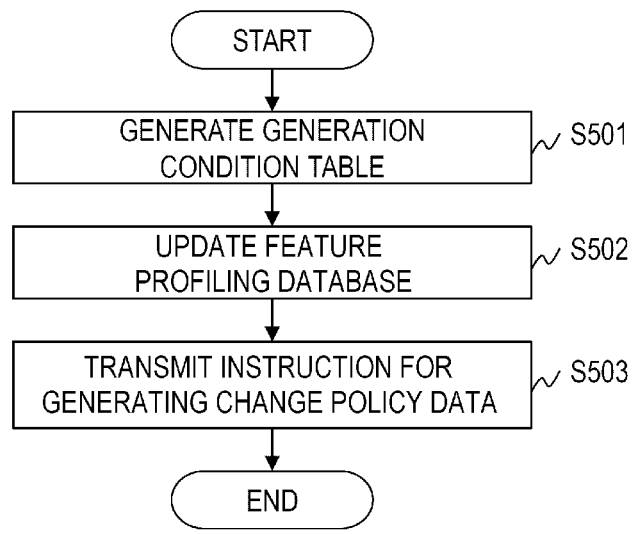
FIG. 18 is a diagram illustrating an example of update processing of the feature profiling database executed by a generation condition setting unit according to the first embodiment.

FIG. 18 is a diagram illustrating an example of update processing of the feature profiling database 122 executed by the generation condition setting unit 130 according to the first embodiment.

When the generation condition setting unit 130 receives a readout request including data indicating a storage location of each piece of data, the generation condition setting unit 130 starts the processing described below.

The generation condition setting unit 130 generates the generation condition table 830 based on the feature profiling database 122 (step S501). Specifically, the following processing is executed.

The generation condition setting unit 130 generates the generation condition table 830 having the same data structure as the feature profiling database 122. The generation condition setting unit 130 sets values stored in the feature 401, the value range 402, the influence value range 403, and the variation unit 404 of each entry of the feature profiling database 122 to the feature 831, the value range 832, the influence value range 833, and the fluctuation unit 834 of each entry.

The generation condition setting unit 130 generates display data for displaying the setting window 800 including the generation condition table 830, and transmits the display data to the terminal 101. The above is the description of the processing in step S501.

Next, when the generation condition setting unit 130 receives the generation request of the change policy data 603 including the operation result of the control possibility 835, the operation result of control possibility 835 is reflected in the control possibility 405 of each entry in the feature profiling database 122 (step S502).

Next, the generation condition setting unit 130 transmits a generation request of the change policy data 603 to the change policy generation unit 131 (step S503). After that, the generation condition setting unit 130 ends the update processing of the feature profiling database 122.

Figure 19:
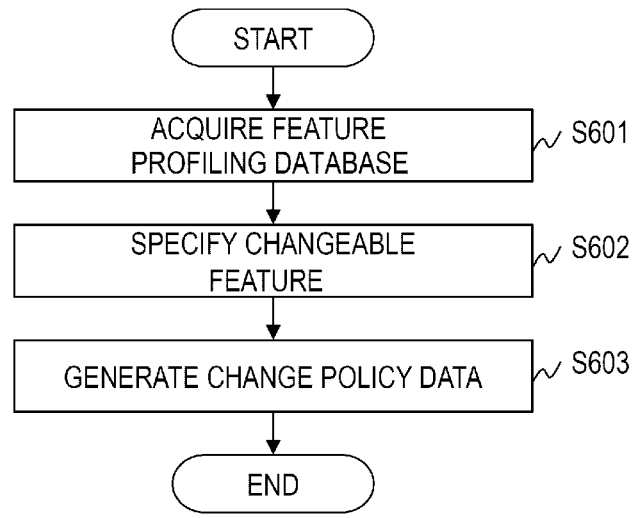
FIG. 19 is a flowchart illustrating an example of a generation processing of the change policy data executed by a change policy generation unit according to the first embodiment.

FIG. 19 is a flowchart illustrating an example of generation processing of the change policy data 603 executed by the change policy generation unit 131 according to the first embodiment.

When the change policy generation unit 131 receives a generation request of the change policy data 603, the change policy generation unit 131 starts processing described below.

The change policy generation unit 131 acquires the feature profiling database 122 (step S601).

Next, the change policy generation unit 131 specifies a changeable feature based on the feature profiling database 122 (step S602).

Specifically, the change policy generation unit 131 specifies a feature corresponding to an entry in which "YES" is set in the control possibility 405 as the changeable feature. When the contribution vector 602 of the evaluation data 601 is calculated, the change policy generation unit 131 may specify a feature whose control possibility 405 is "YES" and whose contribution is greater than a threshold as the changeable feature.

Next, the change policy generation unit 131 generates the change policy data 603 from the evaluation data 601 (step S603). After that, the change policy generation unit 131 ends the generation processing of the change policy data 603. In step S603, the following processing is executed.

(Processing 1) The change policy generation unit 131 selects a feature to be changed from specified features. Various methods of selecting the feature to be changed are conceivable. For example, the change policy generation unit 131 acquires the contribution vector 602 of the evaluation data 601, and selects the feature to be changed in descending order of contribution.

(Processing 2) The change policy generation unit 131 generates the change policy data 603 by changing values of features (a set of features) selected by the feature profiling database 122 within a range of the influence value range 403 of entries corresponding to the selected features (a set of features). At this time, the values of the features are changed in accordance with the variation unit 404. The change policy generation unit 131 stores the generated change policy data 603 in the work area.

For example, when correlation information of the change rate of the contribution and the value of the feature exists, the change policy generation unit 131 changes the feature value within a range in which the change rate of the contribution is large and the range of the influence value range 403 overlaps therewith. The invention is not limited to the method of changing the feature value.

In (Processing 1), a plurality of features may be selected. In this case, in (Processing 2), the change policy data 603 is generated by changing each of the plurality of features.

In the first embodiment, it is assumed that an arbitrary number of pieces of the change policy data 603 is generated. It is assumed that the number of generated change policy data 603 is set in advance. The above is the description of the processing in step S603.

Figure 20:
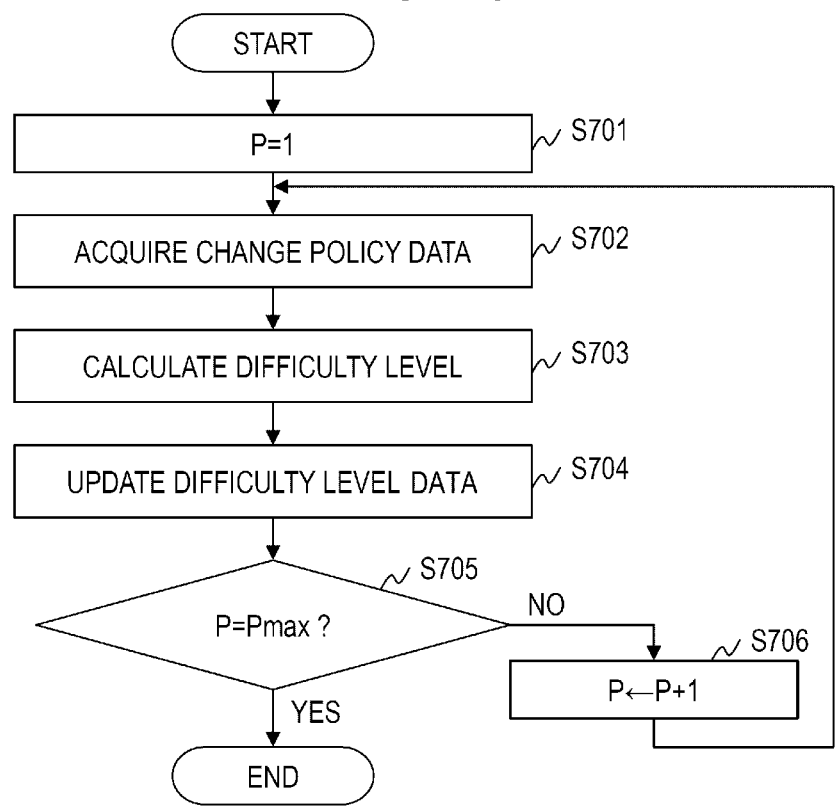
FIG. 20 is a flowchart illustrating an example of difficulty level calculation processing executed by a difficulty level calculation unit according to the first embodiment.

FIG. 20 is a flowchart illustrating an example of difficulty level calculation processing executed by the difficulty level calculation unit 132 according to the first embodiment.

When the difficulty level calculation unit 132 receives a difficulty level calculation request, the difficulty level calculation unit 132 starts the processing described below.

The difficulty level calculation unit 132 initializes a variable P (step S701). Here, the variable P is a variable indicating a number for identifying the change policy data 603.

Specifically, the difficulty level calculation unit 132 sets "1" to the variable "P". At this time, the difficulty level calculation unit 132 sets the number of pieces of the change policy data 603 to Pmax.

Next, the difficulty level calculation unit 132 acquires the change policy data 603 corresponding to the variable P (step S702), and calculates a difficulty level of the acquired change policy data 603 (step S703). For example, the following calculation method can be considered.

(Calculation method 1) The difficulty level calculation unit 132 calculates a distance between the change policy data 603 and each piece of instance data in a space (a feature space) of a feature included in the change policy data 603. The difficulty level calculation unit 132 sets a smallest distance to the difficulty level.

(Calculation method 2) The difficulty level calculation unit 132 selects the instance data based on an arbitrary selection policy, and calculates a distance between the change policy data 603 and the selected instance data in the feature space. The difficulty level calculation unit 132 sets the calculated distance to the difficulty level.

(Calculation method 3) The difficulty level calculation unit 132 calculates a centroid of a instance data group in the feature space, and sets the centroid as centroid instance data. The difficulty level calculation unit 132 calculates a distance between the change policy data 603 and a representative instance data in the feature space. The difficulty level calculation unit 132 sets the calculated distance to the difficulty level.

Next, the difficulty level calculation unit 132 updates the difficulty level data 606 (step S704).

Specifically, the difficulty level calculation unit 132 adds an entry to the difficulty level data 606, sets a value of the variable P to the ID 1301 of the added entry, and sets the difficulty level calculated to the difficulty level 1302.

Next, the difficulty level calculation unit 132 determines whether or not the variable P coincides with the Pmax (step S705). That is, it is determined whether or not the processing of all the change policy data 603 is completed.

When it is determined that the variable P does not coincide with Pmax, the difficulty level calculation unit 132 sets a value obtained by adding 1 to the variable P to the variable P (step S706), and then returns to step S702.

When it is determined that the variable P coincides with the Pmax, the difficulty level calculation unit 132 ends the difficulty level calculation processing.

Figure 21:
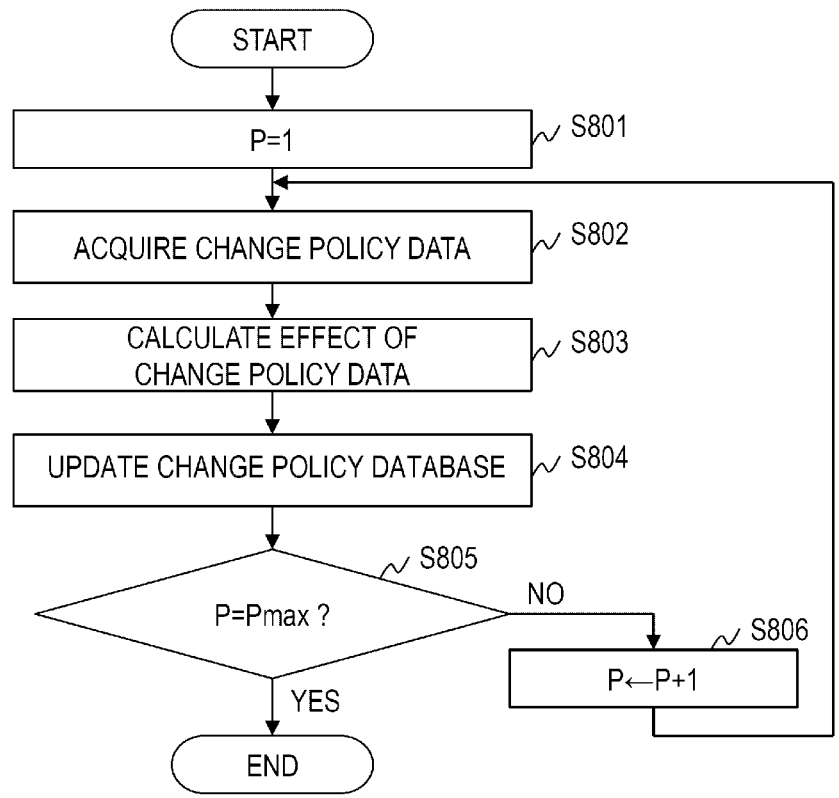
FIG. 21 is a flowchart illustrating an example of management information generation processing executed by a management data generation unit according to the first embodiment.

FIG. 21 is a flowchart illustrating an example of management information generation processing executed by the management data generation unit 133 according to the first embodiment.

When the management data generation unit 133 receives a generation request of the change policy database 135, the management data generation unit 133 starts the processing described below.

The management data generation unit 133 initializes a variable P (step S801). Here, the variable P is a variable indicating a number for identifying the change policy data 603.

Specifically, the management data generation unit 133 sets 1 to the variable P. At this time, the management data generation unit 133 sets the number of pieces of the change policy data 603 to Pmax.

Next, the management data generation unit 133 acquires the change policy data 603 corresponding to the variable P (step S802), and calculates an effect of the acquired change policy data 603 (step S803).

Specifically, the management data generation unit 133 acquires the prediction result data 604 and the prediction result data 605 by transmitting a prediction request including the evaluation data 601 and the change policy data 603 to the predictor 110. The management data generation unit 133 calculates a difference between two prediction results 604 and 605 as an effect.

Next, the management data generation unit 133 updates the change policy database 135 (step S804). Specifically, the following processing is executed.

The management data generation unit 133 adds an entry to the change policy database 135, and sets an identification number to the ID 501 of the added entry.

The management data generation unit 133 compares the evaluation data 601 and the change policy data 603, and specifies the changed feature. The management data generation unit 133 sets the identification information and the value of the specified feature included in the evaluation data 601 to the feature 502 of the added entry. The management data generation unit 133 sets the identification information and the value of the specified feature included in the change policy data 603 to the feature 503 of the added entry.

The management data generation unit 133 sets the effect calculated in step S803 to the effect 504 of the added entry.

The management data generation unit 133 refers to the difficulty level data 606, and searches for an entry whose value of the ID 1301 coincides with the value of the variable P. The management data generation unit 133 acquires the difficulty level from the searched entry, and sets the difficulty level acquired to the difficulty level 505 of the added entry. The above is the description of the processing in step S804.

Next, the management data generation unit 133 determines whether or not the variable P coincides with the Pmax (step S805). That is, it is determined whether or not the processing of all the change policy data 603 is completed.

When it is determined that the variable P does not coincide with the Pmax, the management data generation unit 133 sets a value obtained by adding 1 to the variable P to the variable P (step S806), and then returns to step S802.

When it is determined that the variable P coincides with the Pmax, the management data generation unit 133 ends the management information generation processing.

Figure 22:
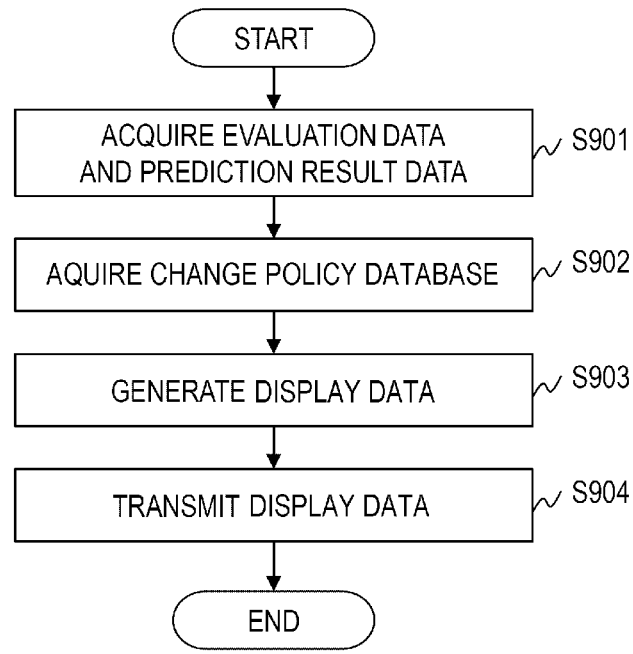
FIG. 22 is a flowchart illustrating display data generation processing executed by an output unit according to the first embodiment.

FIG. 22 is a flowchart illustrating display data generation processing executed by the output unit 134 according to the first embodiment. FIG. 23 is a diagram showing an example of a result display screen 2300 displayed on the terminal 101 according to the first embodiment.

When the output unit 134 receives an output request, the output unit 134 starts the processing described below.

The output unit 134 acquires the evaluation data 601 and the prediction result data 605 (step S901), and acquires the change policy database 135 (step S902).

The output unit 134 generates the display data 607 based on the evaluation data 601, the prediction result data 605, and the change policy database 135 (step S903).

The output unit 134 transmits the generated display data 607 to the terminal 101 (step S904). Then, the output unit 134 ends the display data generation processing.

When the terminal 101 receives the display data 607, the terminal 101 displays the result display screen 2300 as shown in FIG. 23.

The result display screen 2300 includes an evaluation data display field 2301 and a change policy data display field 2302.

The evaluation data display field 2301 is a field that displays information related to the evaluation data 601. A display table 2310 is displayed in the evaluation data display field 2301. The display table 2310 includes an entry including a feature 2311, a value 2312, and a contribution 2313. One entry exists for one feature.

The feature 2311 is a field that stores identification information of the feature. The value 2312 is a field that stores the feature. The contribution 2313 is a field that stores the contribution of the feature.

The change policy data display field 2302 is a field that displays information related to the change policy data 603. A display table 2320 is displayed in the change policy data display field 2302. The display table 2320 includes an entry constituted by an ID 2321, a feature 2322, a feature 2323, an effect 2324, and a difficulty level 2325. The ID 2321, the feature 2322, the feature 2323, the effect 2324, and the difficulty level 2325 are the same fields as the ID 501, the feature 502, the feature 503, the effect 504, and the difficulty level 505.

The change policy data 603 displayed in the display table 2320 is rearranged based on at least one of an effect and a difficulty level. As a result, it is possible to preferably present the change policy data 603 that can be implemented and expected to achieve the purposes.

The computer system according to the first embodiment may present the change policy data 603 as information useful for achieving the purposes related to the object. Based on the change policy data 603, the user can formulate a policy for implementing an object state in which the purposes related to the object is expected to be achieved.

An application example according to the computer system of the first embodiment will be described. Here, it is assumed that the predictor 110 outputs a crime occurrence rate of a town as a prediction result. By referring to the change policy data 603, the user can grasp a state of the town in which the crime occurrence rate decreases. Further, the user can formulate a security planning, a city planning, and the like based on the change policy data 603. Further, by referring to the effect 2324 and the difficulty level 2325, the user can grasp the change policy data 603 that can be implemented and expected to achieve the purposes.

The computer system according to the first embodiment can efficiently generate the change policy data 603 having a high objective achievement effect based on the feature profiling database 122. Therefore, the change policy data 603 can be presented at a high speed while reducing the calculation cost.

The invention is not limited to the above-mentioned embodiment, and includes various modifications. In addition, for example, the embodiment described above has been described in detail for easy understanding of the invention, and the invention is not necessarily limited to those including all the configurations described above. In addition, a part of a configuration of each embodiment can be added, deleted, or replaced with another configuration.

Each of the configurations, functions, processing units, processing methods described above may be partially or entirely implemented by hardware such as through design using an integrated circuit. Further, the invention can also be implemented by a program code of software that implements the functions of the embodiment. In this case, a storage medium storing the program code is provided to a computer, and a processor included in the computer reads out the program code stored in the storage medium. In this case, the program code itself read out from the storage medium implements the functions of the above-mentioned embodiment, and the program code itself and the storage medium storing the program codes constitute the invention. As a storage medium for supplying such a program code, a flexible disk, a CD-ROM, a DVD-ROM, a hard disk, a Solid State Drive (SSD), an optical disk, a magneto-optical disk, a CD-R, a magnetic tape, a nonvolatile memory card, a ROM, or the like is used.

Further, the program code for implementing the functions described in the present embodiment can be implemented in a wide range of programs or script languages such as assembler, C/C++, perl, Shell, PHP, Python, and Java (registered trademark).

Further, the program code of the software that implements the functions of the embodiment may be stored in a storage unit such as a hard disk or a memory of a computer or a storage medium such as a CD-RW or a CD-R by delivering via a network, and a processor included in the computer may read out and execute the program code stored in the storage unit or the storage medium.

In the embodiment described above, control lines and information lines are considered to be necessary for explanation, and all control lines and information lines are not necessarily shown in the product. All configurations may be connected to each other.

What is claimed is:

1. A computer system, comprising:
a first computer, a second computer and a third computer connected via a network,
wherein the first computer is configured to store a prediction model which implements artificial intelligence (AI) for predicting an event of an object based on evaluation data that includes a plurality of feature values of respective features indicating a state of the object,
wherein the second computer is configured to store:
a database that stores a plurality of pieces of predetermined analysis data including a plurality of features identical to the evaluation data and corresponding feature values, and
a feature profiling database that defines a change rule of each of the plurality of feature values included in the evaluation data, which is generated based on a result of the prediction of the event of the object by the AI prediction implemented by the prediction model, the change rule including an influence value range indicating a range of values obtainable by the features, and a variation unit indicating a minimum value a respective feature value varies, for each of the features,
wherein the first computer is configured to:
calculate a contribution vector for each piece of the predetermined analysis data based on the predetermined analysis data and the prediction model, each contribution vector including a numerical degree of influence of each feature value for each piece of the predetermined analysis data, and
send the calculated contribution vectors to the second computer,
wherein the second computer is configured to:
receive the calculated contribution vectors from the second computer,
calculate a range defined by a maximum value and a minimum value of the features values of each feature of the analysis data as a value range,
calculate a minimum value of respective differences between the feature values of each feature as a variation unit,
calculate an influence value range of each feature, the influence value range includes feature values of the predetermined analysis data having a respective numerical degree of influence from the corresponding contribution vector that is greater than a threshold value, and
update the feature profiling database by updating the influence value range with the calculated influence value range of each feature and updating the calculated variation unit of each feature,
wherein the third computer is configured to:
generate a plurality of pieces of change policy data, which are changes of the plurality of feature values included in the evaluation data based on the feature profiling database,
calculate an evaluation value of each of the plurality of pieces of change policy data, which indicates a magnitude of an effect of each of the plurality of pieces of change policy data has on a key performance indicator (KPI), based on the prediction model, the evaluation data, and the plurality of pieces of change policy data,
generate display data indicating the plurality of pieces of change policy data and the evaluation value of each of the plurality of pieces of change policy data, and
display the display data.

2. The computer system according to claim 1, wherein the entry includes a control value indicating whether or not the feature values are changeable values, and
the third computer is further configured to:

select a feature whose value can be changed from the plurality of features of the evaluation data based on the control value, and change a feature value of selected evaluation data based on an influence value range of a feature of the selected evaluation data.

3. The computer system according to claim 1, wherein the processor calculates, as a difficulty level, a distance between the change policy data and the analysis data in a feature space constituted by the plurality of features.

4. The computer system according to claim 1, wherein the processor calculates, as a difficulty level, a difference between a prediction result of the change policy data and a prediction result of the evaluation data.

5. A method of a computer system, wherein the computer system comprises a first computer, a second computer and a third computer connected via a network, the method comprising:

storing, by the first computer, a prediction model which implements artificial intelligence (AI) for predicting an event of an object based on evaluation data that includes a plurality of feature values of respective features indicating a state of the object;

storing, by the second:

a database that stores a plurality of pieces of predetermined analysis data including a plurality of features identical to the evaluation data and corresponding feature values, and a feature profiling database that defines a change rule of each of the plurality of feature values included in the evaluation data, which is generated based on a result of the prediction of the event of the object by the AI prediction implemented by the prediction model, the change rule including an influence value range indicating a range of values obtainable by the features, and a variation unit indicating a minimum value a respective feature value varies, for each of the features;

executing, by the first computer:

calculating a contribution vector for each piece of the predetermined analysis data based on the predetermined analysis data and the prediction model, each contribution vector including a numerical degree of influence of each feature value for each piece of the predetermined analysis data; and sending the calculated contribution vectors to the second computer;

executing, by the second computer:

receiving the calculated contribution vectors from the second computer;

calculating a range defined by a maximum value and a minimum value of the features values of each feature of the analysis data as a value range;

calculating a minimum value of respective differences between the feature values of each feature as a variation unit;

calculating an influence value range of each feature, the influence value range includes feature values of the predetermined analysis data having a respective numerical degree of influence from the corresponding contribution vector that is greater than a threshold value; and updating the feature profiling database by updating the influence value range with the calculated influence value range of each feature and updating the calculated variation unit of each feature, executing, by the third computer:

generating a plurality of pieces of change policy data, which are changes of the plurality of feature values included in the evaluation data based on the feature profiling database;

calculating an evaluation value of each of the plurality of pieces of change policy data, which indicates a magnitude of an effect each of the plurality of pieces of change policy data has on a key performance indicator (KPI) using the prediction model, the evaluation data, and the plurality of pieces of change policy data;

generating display data indicating the plurality of pieces of change policy data and the evaluation value of each of the plurality of pieces of change policy data; and displaying the display data.

6. The method according to claim 5, wherein the entry includes a control value indicating whether or not the feature values are changeable values, and wherein the third computer further executes steps comprising:

selecting a feature whose value can be changed from the plurality of features of the evaluation data based on the control value, and changing a feature value of selected evaluation data based on an influence value range of a feature of the selected evaluation data.

7. The method according to claim 5, wherein the third computer further executes steps comprising: calculating, as the evaluation value, a distance between the change policy data and the analysis data in a feature space constituted by the plurality of features.

8. The method according to claim 5, wherein the third computer further executes steps comprising: calculating, as the evaluation value, a difference between a prediction result of the change policy data and a prediction result of the evaluation data.

* * * * *